Aug. 23, 1966     M. E. LIPPMAN     3,268,044
COUPLING DEVICE
Filed April 13, 1964
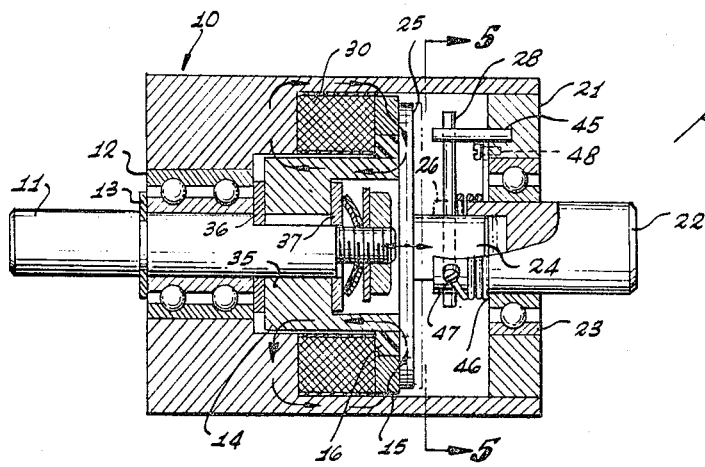
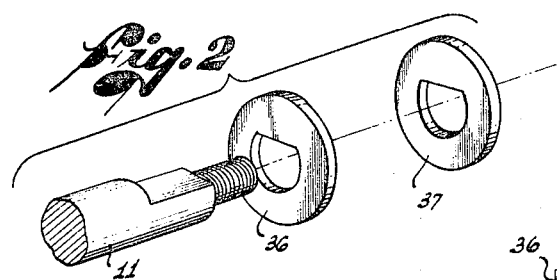
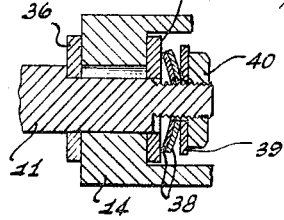
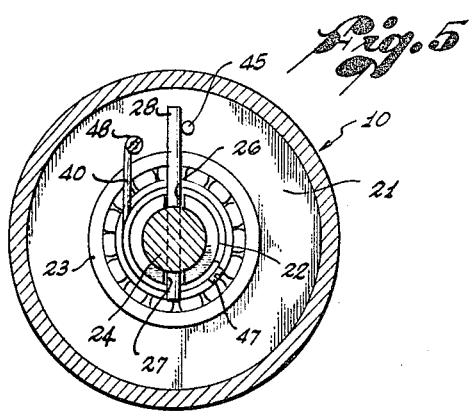
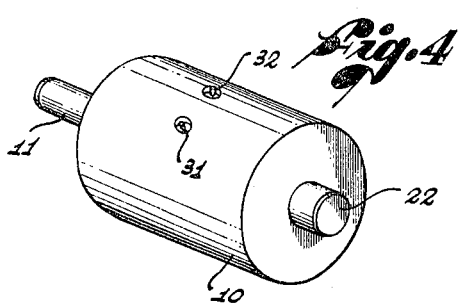
INVENTOR.
MYRON E. LIPPMAN
BY Fulwider, Patton, Rieber
Lee, and Utecht
ATTORNEYS United States Patent Office 3,268,044
Patented August 23, 1966

3,268,044
COUPLING DEVICE
Myron E. Lippman, Northridge, Calif., assignor to General Scientific Corp., San Fernando, Calif., a corporation of California
Filed Apr. 13, 1964, Ser. No. 359,235
7 Claims. (Cl. 192—84)

This invention relates to mechanical coupling devices, and more particularly to a novel clutch mechanism and output structure thereof for utilizing electrical control means to selectively couple a pair of shafts for unitary movement.

It is well known, of course, to use a mechanical slip clutch or an electromagnetic clutch to couple a pair of shafts together. Because of the rapidity with which control current can be applied and removed, and the consequent rapidity of clutch engagement and disengagement, the electromagnetic clutch is preferred where the load shaft is to be selectively turned through discrete angular steps.

Where there are limit stops for a load shaft which is controlled through an electromagnetic clutch, it has been necessary to provide a mechanical slip clutch as a means to avoid damage to various parts. To this end, the mechanical slip clutch is added in tandem to the electromagnetic clutch, e.g., as between the load shaft and the output shaft of the electromagnetic clutch, or between the driving shaft and the input shaft of the electromagnetic clutch.

Such axial "stacking" of clutches inherently adds to the size, weight and number of parts of the coupling device. It further increases maintenance problems, inasmuch as there are more parts to keep in axial alignment and in proper working order.

A still further complication in the use of prior art clutches arises where it is necessary to drive a mechanism which has a null position to which it is to be returned when the clutch is disengaged. Typically, the input shaft of such a mechanism is provided with a limit stop and a spring-return. Also, it is necessary to couple this shaft to the clutch output shaft by means which do not prevent axial movement of the clutch shaft. Again, the null return means constitutes an added structure placed along the axis of the clutch and load, thus further taxing available space and weight.

It is an object of my invention to provide a coupling device which overcomes the above and other disadvantages of the prior art.

It is another object of my invention to provide a coupling device employing both mechanical and electromagnetic clutch mechanisms in the same space required for a single clutch of the prior art.

A further object of my invention is to provide a coupling device as aforesaid wherein the armature and output shaft of the electromagnetic clutch are arranged for automatic return to a fixed position when the clutch is disengaged.

It is also an object of my invention to provide an improved clutch mechanism.

A still further object of my invention is provide a coupling device forming several mechanisms with a minimum number of component parts of simple, compact design and rugged construction, capable of reliable operation over a long operating life.

The above and other objects and advantages of my invention will become apparent from the following description along with the accompanying drawing of an illustrative embodiment thereof, in which:

FIGURE 1 is a longitudinal sectional view of a coupling device of my invention, showing the mechanical slip clutch located within the electromagnetic clutch, and showing the output shaft and the armature of the electromagnetic clutch arranged for automatic return to a predetermined position when the clutch coil is de-energized;

FIGURE 2 is a perspective view of the noncircular portion of the input shaft and the correspondingly shaped washers, to aid in explaining the operation of the parts of the slip clutch;

FIGURE 3 is a fragmentary sectional view of the slip clutch portion of the structure of FIGURE 1;

FIGURE 4 is a perspective view of the device of FIGURE 1, showing the externally accessible pins of the clutch coil; and FIGURE 5 is a sectional view taken along the line 5—5 of FIGURE 1, showing the arrangement of the parts of the null seeking mechanism.

Referring to FIGURE 1, the coupling device shown employs a housing 10 into which an input shaft 11 extends, such shaft being rotatably supported in a bearing 12. The bearing 12 is of sufficient length to prevent any axial play of the input shaft 11. The shaft is restrained against inward movement by a snap-ring 13 which abuts the outer end of the bearing 12.

The inner end of the shaft 11 is located within a unique electromagnetic clutch, which includes an inner cylindrical magnetic body 14 having a radial flange composed of an outer magnetic ring 15, and an inner ring 16 of non-magnetic material. The non-magnetic inner ring 16 is formed of a suitable bonding material, such as a synthetic resinous material, to hold the outer ring 15 and the body 14 in fixed spaced relation.

At the opposite end of the housing 10 is a cover or end plate 21 in which an output shaft 22 is rotatably mounted, as in a bearing 23. The inner end of the output shaft 22 matingly receives a short stub shaft 24 which carries a magnetic disk armature 25. The open end of the ouput shaft 22 is provided with opposed slots 26, 27 (see FIGURE 5), and a transverse pin 28 embedded in the stub shaft 24 passes through these slots. The diameter of the pin 28 is such as not to impede slight axial movement of the stub shaft, but to effect unitary rotation of these shafts whenever the stub shaft 24 is turned.

Turning of the stub shaft is effected through magnetic attraction of the armature 25 to the body 14 and ring 15, and turning the body 14 by the input shaft 11. For the magnetic attraction, an energizing coil 30 surrounds the body 14 and is secured, as by plastic bonding material, to the confronting wall of the housing 10. As shown in FIGURE 4, terminal pins 31, 32 for the coil extend outside the housing 10 for connection to a source of energizing current (not shown).

When the coil 30 is energized, a magnetic field is set up in which the lines of force pass through the body 14, around the non-magnetic ring 16 and through the outer ring 15. Thus, the provision of the non-magnetic ring effectively causes the outer ring 15 and the adjacent open end of the body 14 to act as opposite poles, and to force magnetic lines passing around the non-magnetic ring 16 to pass through the disk 25. The result is that the disk is strongly attracted and held to the body 14 and the outer ring 15.

To effect rotation of the body 14 by the input shaft 11, that portion of the body 14 through which the shaft 11 passes is a short cylindrical section 35 of reduced diameter. The section 35 is captured between two washers 36, 37 (see FIGURES 1, 2 and 3) which have non-circular central openings. The portion of the shaft 11 on which the washers 36, 37 are positioned is similarly non-circular, so that the washers and the shaft are arranged for unitary rotation.

The inner end of the shaft 11 is threaded, as shown, and supports spring washers 38 and a bearing washer 39 which is sandwiched between the washer 37 and a nut 40 threaded into the end of the shaft 11. The nut 40 is positioned so that the spring washers 38 cause sufficient frictional force to be set up between the confronting faces of the cylindrical section 35 and the washers 36, 37 as to normally cause the body 14 to rotate with the input shaft 11.

While the electromagnetic clutch is engaged, the attractive force on the armature 25 is greater than the frictional engagement force between the washers 36, 37 and the section 35 of the body 14. If the load driven by the output shaft 22 stalls while the electromagnetic clutch is engaged, the washers 36, 37 continue turning with the input shaft 11 but slip on the confronting faces of the body 14 and thereby prevent damage to the driving means, the coupling device or the load.

In this latter connection, it should be noted that by having the washers 36, 37 turn with the input shaft 11, the nut 40 cannot turn on the shaft 11 while the washers are slipping on the body 14. Because the washers 36, 37 turn with the shaft 11, the spring washers 38, the back-up washer 39 and the nut 40 all turn as a unit with the shaft.

My coupling device also contains provisions for returning the output shaft 22 to a particular position when the electromagnetic clutch is disengaged. Referring to FIGURES 1 and 5, the end plate 21 has a stop pin 45 secured thereto which is adapted to be engaged by the outer end of the pin 28 that is carried by the stub shaft 24. A spring 46 is placed over the inner end of the output shaft 22, and has its ends secured at 47 to the output shaft and at 48 to the inner wall of the plate 21.

The spring constantly urges the pin 28 in one direction (clockwise in FIGURE 5), and the input shaft 11 can cause the output shaft to be turned only if the input shaft is turned in the opposite direction. With this arrangement, the spring always forces the output shaft 22 and the armature 25 clockwise whenever the clutch coil is de-energized, to the position where the radial pin 25 engages the stop pin 45.

As will also be apparent, if the input shaft is turned too far during clutch engagement, the pin 25 is brought up against the stop pin 45, and the mechanical slip clutch then functions as described to prevent damage to any of the parts of the coupler or the driving source and load.

It will be apparent that while I have illustrated and described a particular embodiment of my coupling device, various modifications may be made therein without departing from the spirit and scope of my invention. Accordingly, I do not intend that my invention shall be restricted, except as by the appended claims.

I claim:

1. A coupling device comprising:

a cup-like body having a flange at its open end, wherein said flange is formed of a pair of concentric integral rings, the inner ring being of non-metallic material and the outer ring being of magnetic material;

an input shaft extending into said body;

a mechanical slip clutch within said body interconnecting said shaft and body for unitary rotation;

an output shaft coaxial with and spaced from said input shaft;

an armature element adjacent said flange mounted on said output shaft for rotation therewith and axial movement with respect thereto;

an energizing coil surrounding said body and adapted to be energized to establish a magnetic field to cause said armature to be attracted and held to said flange;

a pair of washers on said input shaft respectively positioned inside and outside the bottom of said body, said washers being rotatable with said input shaft; and means resiliently forcing said washers toward each other so they capture the bottom of said body between them, and with sufficient force to cause said body to turn with said input shaft.

2. A coupling device as defined in claim 1, wherein said means includes spring elements on the inner end of said input shaft, and a nut threaded on said inner end and positionable to cause said spring elements to exert a selected thrust on the adjacent washer, the other washer being held against axial movement along said input shaft.

3. A null-seeking electromagnetic coupler comprising:

a housing;

an input shaft and an output shaft extending into said housing through opposite ends thereof, said shafts being rotatable in respective bearings in said housing ends;

an electromagnetic clutch in said housing for selectively coupling said shafts for unitary turning movement, said clutch including an armature member;

means supporting said armature member for turning said output shaft therewith;

limit stop means including a pair of pins, one being secured to the housing and the other being rotatable with said armature member, said one pin being in the path of movement of said other pin;

and biasing means connected to said housing and output shaft for continuously urging said other pin toward said one pin, whereby said pins are always in abutting position when the clutch is disengaged, such position being the null position of said output shaft.

4. A coupler as defined in claim 3, wherein said supporting means includes a short stub shaft for said armature, said output shaft at its inner end having an opening in which said stub shaft is slidable, the inner end of said output shaft having a pair of opposed transverse slots therein;

and a pin embedded in said stub shaft and having its ends extending through said slots, the pin being of such a size as to be axially slidable in said slots but incapable of movement laterally within said slots.

5. A coupler as defined in claim 4, wherein said embedded pin is said other pin.

6. A coupler as defined in claim 5, wherein the biasing means includes a coil spring surrounding the inner end of said output shaft and having its respective ends secured to said output shaft and the interior of said housing.

7. A coupler as defined in claim 3, further including a mechanical slip clutch located within the electromagnetic clutch and interconnecting the inner end of said input shaft and the electromagnetic clutch.

References Cited by the Examiner
UNITED STATES PATENTS
2,438,223   3/1948   Lear _____ 192—18

DAVID J. WILLIAMOWSKY, *Primary Examiner.*

DON A. WAITE, *Examiner.*

A. T. MCKEON, *Assistant Examiner.*